United States Patent [19]

Fickes

[11] 4,017,723
[45] Apr. 12, 1977

[54] APPARATUS FOR CONTROLLING REPETITIVE CUTTING CYCLES ON A WORK PIECE BEING CUT BY A CUTTING TOOL OF A LATHE

[75] Inventor: Ellwood Donald Fickes, Waynesboro, Va.

[73] Assignee: General Electric Company, New York, N.Y.

[22] Filed: July 25, 1975

[21] Appl. No.: 599,229

[52] U.S. Cl. .............................. 235/151.11; 83/72; 90/13 C; 318/569; 408/8
[51] Int. Cl.[2] .................. G06F 15/46; G05B 19/18
[58] Field of Search ............. 235/151.11; 318/569, 318/600, 571, 572; 82/2 B, 1 C; 90/11 A, 11 R, 13 R, 13 C, 13.5, 13.9, DIG. 1, 11.5, 11.52, 11.54, 11.56; 408/3, 6, 8, 11, 25; 83/71, 72, 74, 360

[56] References Cited

UNITED STATES PATENTS

| | | | |
|---|---|---|---|
| 3,475,997 | 11/1969 | Wohlfeil | 408/8 |
| 3,609,321 | 9/1971 | Campbell, Jr. | 235/151.11 |
| 3,614,575 | 10/1971 | Cutler | 318/569 |
| 3,676,651 | 7/1972 | McDaniel | 235/151.11 |
| 3,825,735 | 2/1974 | Bowers et al. | 235/151.11 |
| 3,911,347 | 10/1975 | Hartung | 235/151.11 X |

Primary Examiner—Joseph F. Ruggiero
Attorney, Agent, or Firm—Stephen A. Young; Walter C. Bernkopf; Robert A. Cahill.

[57] ABSTRACT

Apparatus for controlling repetitive cutting cycles on a work piece being cut by a cutting tool of a lathe. The apparatus is comprised of means for storing a plurality of coded signals to control a depth of cut, a length of cut, a removal and a return path for a cutting cycle, and a desired number of identical cutting cycles. Further provided is means for enabling successive and sequential movement of the cutting tool over a complete cutting cycle of the work piece. Also provided is means coupled and responsive to the enabling means for controlling a continuation of the cutting of the work piece over additional identical cutting cycles. The number of identical cutting cycles is predetermined by a coded signal received by the controlling means from the storing means, and the depth of the cut for each cycle is predetermined by a coded signal received by the enabling means from the storing means.

8 Claims, 3 Drawing Figures

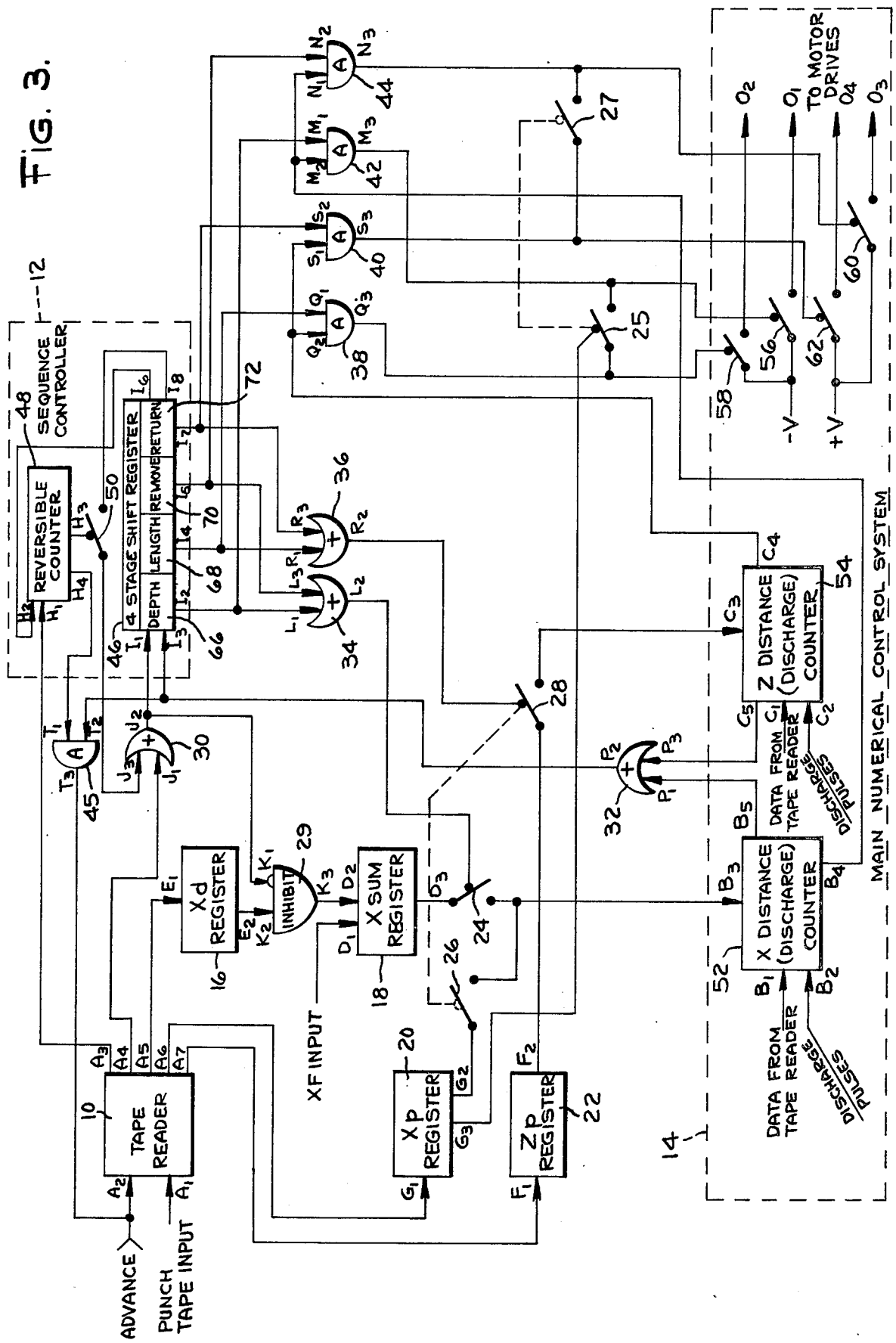

APPARATUS FOR CONTROLLING REPETITIVE CUTTING CYCLES ON A WORK PIECE BEING CUT BY A CUTTING TOOL OF A LATHE

BACKGROUND OF THE INVENTION

1. Field of the Invention

This invention relates to apparatus for controlling repetitive cutting cycles on a work piece being cut by a cutting tool of a lathe.

2. Description of The Prior Art

Prior art numerical control apparatus for providing control over repetitive cutting cycles on a work piece being cut by a cutting tool on a lathe has been provided by programming the apparatus with a final contour program. The thickness of the original roughing cut could also be specified. After this, the apparatus, which acts as a computer, calculates the number of roughing cuts to be made and the actual path for each cut. The actual thickness of a final smoothing cut is then also calculated and provided. Thus, the apparatus as described above actually requires a computer to perform the calculations, which, in turn, require complex software to accomplish its purpose. This is both cumbersome, time consuming and expensive.

OBJECTS OF THE INVENTION

It is therefore an object of this invention to provide an apparatus for controlling repetitive cutting operations on a work piece being cut by a cutting tool on a lathe, which apparatus eliminates the software requirements and the complex computer calculations required by the prior art.

It is another object of this invention to provide an apparatus for controlling repetitive cutting operations on a work piece being cut by a cutting tool on a lathe, wherein the number of repetitive cutting cycles and depth of cut are preselected so that the work piece is reduced in this manner to the desired dimension, rather than having to calculate the number of cuts required to reduce the work piece to a final preselected dimension.

Other objects of the invention will be pointed out hereinafter.

SUMMARY OF THE INVENTION

According to a broad aspect of the invention there is provided an apparatus for controlling repetitive cutting cycles on a work piece being cut by a cutting tool of a lathe. The apparatus is comprised of means for storing a plurality of coded signals to control a depth of cut, a length of cut, a removal and a return path for a cutting cycle, and a desired number of identical cutting cycles. Further provided are means for enabling successive and sequential movement of the cutting tool over a complete cutting cycle of the work piece, and means coupled and responsive to the enabling means for controlling continuation of the cutting of the work piece over additional identical cutting cycles. The number of cutting cycles is predetermined by a coded signal received by the controlling means from the storing means, and the depth of the cut for each cycle is also predetermined by a coded signal received by the enabling means from the storing means.

According to another aspect of the invention, the enabling means is comprised of a four stage shift register for receiving a bit of information, and means for consecutively advancing the bit through each of the four stages during the course of one of the cutting cycles. Thus, when the bit is within a first stage of the four stage register, the cutting tool is moving along a first path to the desired depth of the cut, and when the bit is advanced to a second stage of the four stage register, the cutting tool is moving along a second path corresponding to the length of the cut as the work piece is actually being cut. Similarly, when the bit is advanced to a third stage of the fourth stage register, the cutting tool is moving along a removal path which is opposite in direction to the first path, and when the bit is advanced to a fourth stage of the four stage register, the cutting tool is moving along a return path which is opposite in direction to the second path.

In accordance with another aspect of the invention, the consecutively advancing means is comprised of a first storage register for receiving from the storing means a coded signal which is indicative of the depth of the cut to be made, a second storage register for receiving and summing the coded signal indicative of the depth of cut to be made to provide a signal indicative of the full movement required of the cutting tool along the first and third paths for each of the successive cutting cycles, a third storage register for receiving from the storing means a coded signal indicative of the length of the second and fourth paths of the movement of the cutting tool, and a first and a second reversible counter for receiving the coded signals respectively from the second and third storage registers to set each of the first and second counters to a count corresponding to the desired path of the cutting tool, and for receiving respective discharge signals corresponding to the actual movement of the cutting tool to reduce the count within each of the respective counters to zero when the cutting tool has reached the end of its designated path. Further included is means for providing a signal to the four stage shift register when either of the counters is discharged to a zero count to advance the bit stored within the shift register to the next successive stage of the shift register.

Accordng to a still further aspect of the invention the means for controlling continuation of the cutting of the work piece over additional identical cutting cycles is comprised of a third reversible counter for receiving a coded signal from the storing means to set the count within the third counter to a number corresponding to the predetermined number of cutting cycles required, and for receiving a discharge signal from the fourth stage of the shift register during each cutting cycle when the bit is advanced into the fourth stage to reduce the count within the third reversible counter by one. In this manner, the count within the third counter is finally reduced to zero during the last cutting cycle. Further provided is means coupled to the third reversible counter for allowing the bit within the fourth stage of the shift register to be transferred to the first stage in response to the receiving of an advance pulse by the shift register until the count within the third reversible counter has been reduced to zero.

According to a still further aspect of the invention, the apparatus is further comprised of a fourth storage register for receiving a coded signal from the storing means, and means coupled to the second and fourth stages of the shift register for enabling the coded signal within the fourth storage register to be transmitted to and set the count of the first counter when the bit is within either of the second and fourth stages. This enables the second and return paths of movement of the cutting tool to be determined by the square root of the sum of the squares of the highest count within the first and second counters when the bit is within either of the second and fourth stages of the shift register.

According to a still further aspect of the invention the apparatus is further comprised of means coupled to the first stage of the shift register and to the first counter for enabling the cutting tool to move along the first path when the bit is within the first stage and until the first counter is discharged to zero, means coupled to the second stage of the shift register and to the second counter for enabling the cutting tool to move along the second path when the bit is within the second stage and until the second counter is discharged to zero, means coupled to the third stage of the shift register and to the first counter for enabling the cutting tool to move along the removal path when the bit is within the third stage and until the first counter is discharged to zero, and means coupled to the fourth stage of the shift register and to the second counter for enabling the cutting tool to move along the return path when the bit is within the fourth stage and until the second counter is discharge to zero.

BRIEF DESCRIPTION OF THE DRAWING

FIG. 3 is an overall schematic and block diagram of the apparatus for controlling repetitive cutting operations on a work piece being cut by a cutting tool on a lathe.

DESCRIPTION OF THE PREFERRED EMBODIMENT

Figure 1:
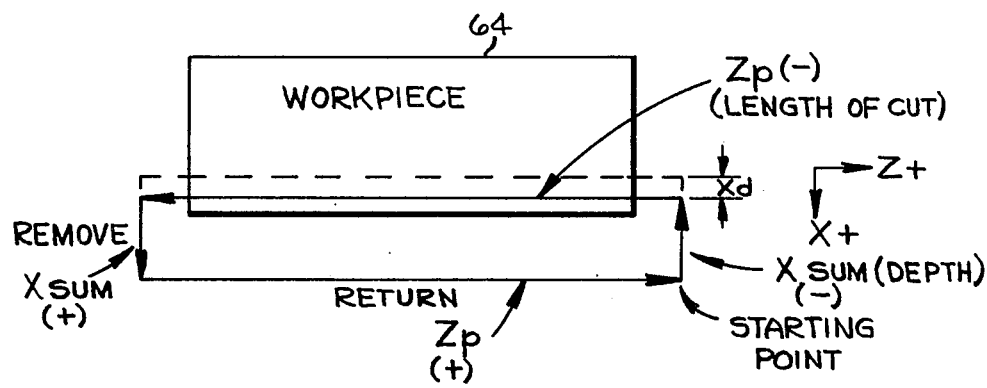
FIG. 1 is a diagram of the cutting cycle for a (non-tapered) straight cut to be made by a cutting tool on a lathe.

The invention will now be explained with reference to FIGS. 1 through 3. As shown in FIG. 3, the apparatus for controlling repetitive cutting cycles on a work piece being cut by a cutting tool of a lathe is comprised of means in the form of a tape reader 10 for storing a plurality of coded signals to control a depth of cut, a length of cut, a removal and return path for a cutting cycle, and a desired number of identical cutting cycles. The apparatus is further comprised to a sequence controller 12, a main numerical control system 14, storage registers 16, 18, 20 and 22, controlled switch means 24, 25, 26, 27, 28, an inhibit gate 29, OR gates 30, 32, 34, 36 and AND gates 38, 40, 42, 44 and 45.

While the storing means is described as being provided by tape reader 10, it should be understood that other types of storing means such as core memories or magnetic tape transports having proper interfacing circuitry could be used in its place. Tape reader 10 could be provided by any standard tape reader which will receive a punch tape as its punch tape input $A_1$ and convert the coded information on the punch tape to the appropriate coded signals to be used to control the operation of the apparatus. In this instance, the tape reader will have another input terminal $A_2$ for receiving signals to indicate an advance of the punch tape feed so that new information may be decoded and stored by the tape reader. Additionally, the tape reader can be provided with output terminals $A_3$, $A_4$, $A_5$, $A_6$ and $A_7$.

Sequence controller 12 can be provided with a four stage shift register 46, a reversible counter 48 and a controlled switch means 50. Main numerical control system 14 includes therein an X distance (discharge) counter 52, a Z distance (discharge) counter 54 and controlled switch means 56, 58, 60 and 62. A more detailed description of the main numerical control system is provided in U.S. Pat. Nos. 3,657,525 and 3,173,001, and it is further disclosed in a Numerical Control System Model No. 3N7502NC102B1 manufactured and sold by the Numerical Control Operation of the General Electric Company, Waynesboro, Va. X and Z distance counters 52 and 54 are generally provided by up-down or reversible counters and are analogous to the respective X Axis and Y Axis Distance Counters 42' and 42 shown in FIG. 1 of the above referred to U.S. Pat. No. 3,173,001.

X and Z distance counters 52 and 54 initially receive coded input signals at respective terminals $B_1$ and $C_1$ from the tape reader in order to set the count within the distance counters to control movement of the cutting tool so that it moves to its desired starting point in relationship to the work piece 64 as shown in FIG. 1. As cutting tool moves, discharge pulses are received at respective input terminals $B_2$ and $C_2$ of the respective distance counters 52 and 54 from a function generator, shown and described in U.S. Pat. No. 3,173,001, until the respective counters are discharged to zero at which point the cutting tool is considered to be located in its desired starting position. The distance between the outer surface of the work piece and the starting point of the cutting tool is a fixed distance which will always be the same, and, in this instance, it is made equal to 0.1 inches. In order to compensate for this fixed distance, a coded signal corresponding to the fixed distance is fed into an input terminal $D_1$ of register 18 from the tape reader. Following this, a coded signal, corresponding to the depth of cut of the work piece desired, is fed into an input terminal $E_1$ of $X_d$ storage register 16 from output terminal $A_5$ of tape reader 10. Similarly, a coded signal corresponding to the desired length of cut is fed into an input terminal $F_1$ of $Z_p$ storage register 22 from output terminal $A_7$ of tape reader 10. Also, in the event that the length of cut is to be made along a sloping or tapered path, a coded signal can be fed from an output terminal $A_6$ of tape reader 10 to an input terminal $G_1$ of $X_p$ storage register 20 such that the final path of the length of cut is determined by the square root of the sum of the squares of the coded values stored within registers 20 and 22. Similarly, a coded signal, indicative of the desired number of cutting cycles, is coupled from output terminal $A_3$ of tape reader 10 to an input terminal $H_1$ of reversible counter 46 so that the count within reversible counter 46 is set to a value indicative of the desired number of identical cutting cycles to be made by the cutting tool.

After the respective coded signals from the tape reader are entered within registers 16, 20 and 22 and counter 46, a start pulse from output $A_4$ is coupled to an input terminal $I_1$ of shift register 46 via an input terminal $J_1$ of OR gate 30 and its output terminal $J_2$ so as to enter a bit of information within a first stage 66 of shift register 46. At the same time the start pulse is coupled from output terminal $J_2$ of OR gate 30 to a control input terminal $K_1$ of inhibit gate 29. For the duration of the start pulse, the coded information stored within register 16 is enabled to be transmitted from its output terminal $E_2$ to an input terminal $K_2$ of inhibit gate 29 and then through an output terminal $K_3$ of the inhibit gate to an input terminal $D_2$ of X sum register 18. In this manner the signal summed and stored within register 18 provides an indication of the sum total of the desired movement of the cutting tool along its first path of movement to a predetermined depth.

When the bit of information is within first stage 66 of shift register 46, an enabling signal is coupled from an output terminal $I_2$ of the first stage of the shift register to respective input terminals $L_1$ and $M_1$ of respective OR gate 34 and AND gate 42. The enabling signal received at terminal $L_1$ of OR gate 34 is coupled from its output terminal $L_2$ to a control terminal of switch means 24 so as to cause switch means 24 to close, and thereby allow the summed coded signal within X sum register 18 to be transmitted from output terminal $D_3$ of register 18 and into input terminal $B_3$ of X distance counter 52 to set the count therewith to a value indicative of the desired first path of movement of the cutting tool. At this point it should be noted that OR gate 34 can deviate from the standard OR gate by having included therein, immediately before output terminal $L_2$, a differentiator circuit for differentiating the signal level received by the OR gate when the bit is entered into the first stage of the shift register so that the differentiated pulse would be applied to the control terminal of switch means 24 to cause the switch means to close for a time sufficient to enable the transfer of the coded information within register 18 to X distance counter 52. Upon the setting of X distance counter 52 to the desired count, an output signal level is applied from an output terminal $B_4$ of counter 52 to respective input terminals $M_2$ and $N_1$ of respective AND gates 42 and 44 wherein these signal levels are maintained at these AND gates for as long as the count within X distance counter 52 is greater than zero. Upon application of the output level signal to input terminal $M_2$ of AND gate 42, an output signal is applied from output terminal $M_3$ of AND gate 42 to a control input terminal of switch means 56 so as to cause the switch means to close and allow a negative power supply (−V) to be applied via a power terminal $O_1$ to an appropriate motor drive for causing the cutting tool to move along the first (depth) path from the starting point in the (−) X direction shown in FIG. 1. As the cutting tool moves along the desired first path of movement, a function generator produces and applied discharge pulses proportional to the movement of the cutting tool via input terminal $B_2$ to X distance counter 52 so as to discharge the counter toward zero as the cutting tool moves along its desired path. Further description of the operation of the function generator for producing discharge pulses in response to movement of the cutting tool is provided in U.S. Pat. No. 3,173,001. As soon as X distance counter 52 is discharged to zero, the output level at output $B_4$ of counter 52 changes to disable AND gates 42 and 44, which, in turn, cause switch means 56 to open, thereby interrupting power to the appropriate motor drive for the cutting tool, and the cutting tool abruptly halts so as to define the end of the first path of movement of the cutting tool. Counter 52 also has another output $B_5$ which can be separated from output $B_4$ by a differentiator circuit and a steering diode so as to generate an advance pulse at output $B_5$ whe X distance counter 52 is discharged to zero, whereupon the advance pulse is coupled to an input terminal $P_1$ of OR gate 32 and out through output terminal $P_2$ of OR gate 32 to an input terminal $I_3$ of shift register 46. Input terminal $I_3$, in this instance, is a shift input whereupon receipt of an advance pulses causes the bit of information to be transferred to the next successive stage, which in this instance, is a second stage 68 of shift register 46.

When the bit of information is in the second (length) stage of the shift register, an enabling signal is provided from an output terminal $I_4$ of the second stage to an input terminal $Q_1$ of AND gate 38 and an input terminal $R_1$ of OR gate 36. The enabling signal received at input $R_1$ of OR gate 36 is transmitted from its output terminal $R_2$ to the control input terminals of respective switch means 26 and 28. This results in switch means 26 and 28 closing so that the signal stored within $Z_p$ register 22 is transmitted from its output terminal $F_2$ to an input terminal $C_3$ of the Z distance counter 54 so as to set the count within this distance counter to a number equivalent to the desired (length of cut) second path to be travelled by the cutting tool as shown in FIG. 1. However, if a coded signal is being stored within $X_p$ register 20, this signal will be transmitted from an output terminal $G_2$ of register 20 to input terminal $B_3$ of X distance counter 52 to set the count of the X distance counter simultaneously with the setting of the Z distance counter 54 by $Z_p$ register 22, whereby, in this instance, the length of cut will be related to the square root of the sum of the square of the count within the X and Z distance counters so as to provide a tapered or sloping cut as shown in FIG. 2. It should also be noted at this point that OR gate 36 can have therein, immediately prior to output terminal $R_2$, a differentiator circuit and/or pulse shaper so that the signal level received at the input terminal of OR gate 36, when the bit is advanced to the second stage, is transformed into a pulse of sufficient duration to close switch means 26 and 28 for the time necessary to enable the coded signal stored within $Z_p$ register 22 and $X_p$ register 20 to be transmitted to respective counters 54 and 52.

Assuming that the cutting tool is to make a straight (non-tapered) cut as shown in FIG. 1, $X_p$ register 20 will not have any coded signal information stored therewithin, and only Z distance counter 54 will be set during the movement of the cutting tool along its second path. As soon as the Z distance counter is set to the desired count, an enabling signal is produced at an output terminal $C_4$ of Z distance counter 54, which signal remains present at output terminal $C_4$ as long as the count within the Z distance counter is greater than zero. This enabling signal at output terminal $C_4$ is applied to respective input terminals $Q_2$ and $S_1$ of respective AND gates 38 and 40. Inasmuch as, at this time, enabling signals are being applied to both input terminals $Q_1$ and $Q_2$ of AND gate 38, an output signal is generated from an output terminal $Q_3$ of AND gate 38 and is applied to a controlling terminal of switch means 58. This causes switch means 58 to close so that the negative power supply (−V) can be applied via an appropriate power output terminal $O_2$ to a required motor drive which will cause the cutting tool to move along the second (length of cut) path in the negative direction as shown in FIG. 1 so as to actually cut the work piece to a first desired depth. Again, as previously explained, as the cutting tool moves along the length of the second path, a function generator shown in U.S. Pat. No. 3,173,0001 produces discharge pulses proportional to the movement of the cutting tool, which pulses are applied to input terminal $C_2$ of Z distance counter 54 to discharge the counter. As soon as Z distance counter 54 is discharged to zero, the signal level at output terminal $C_4$ of the counter changes and causes AND gates 38 and 40 to be disabled, thereby causing switch means 58 to open and interrupt the flow of power from terminal $O_2$ so as to cause the cutting tool to halt and the second path to terminate. At the same time, an advance pulse is generated at an output $C_5$ of Z distance counter 54, which pulse is applied to an input terminal $P_3$ of OR gate 32 and is then coupled from output terminal $P_2$ of OR gate 32 to shift input terminal $I_3$ of shift register 46 to, in turn, cause the bit of information within the second stage of the shift register to be transferred to a third stage 70 of the shift register. As previously noted with regard to terminals $B_4$ and $B_5$ of X distance counter 52, terminal $C_5$ can likewise be separated from terminal $C_4$ by an appropriate differentiating circuit and steering diode to cause the advance pulse to be generated at output terminal $C_5$ when the counter is discharged to zero.

Figure 2:
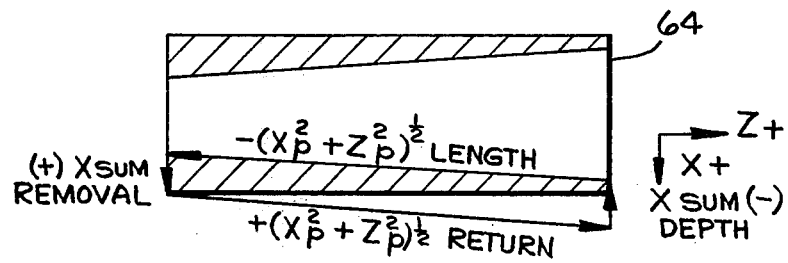
FIG. 2 is a schematic diagram of a cutting cycle for a work piece being cut by a cutting tool on a lathe over a tapered cutting path.

However, if a tapered cut were desired, as shown in FIG. 2, $X_p$ register 20 would have a coded signal stored therewithin, which signal would be transmitted to X distance counter 52 when switch means 26 and 28 are simultaneously closed. This, in turn, would cause both of counters 52 and 54 to be set to their respective counts as previously described above. Under these circumstances, an output signal is provided at output terminal $G_3$ of $X_p$ register 20 which indicates that a coded signal is being stored within $X_p$ register 20. This can be routinely accomplished by having each flip-flop output of register 20 connected to output terminal $G_3$ via an OR gate. The signal level output from terminal $G_3$ of $X_p$ register 20 is applied to the control input terminals of switch means 25 and 27 which causes switch means 25 and 27 to close, and this causes switch means 56 to close simultaneously with switch means 58, thereby enabling the cutting tool to move simultaneously along the X and the Z axis to cut a tapered path in the work piece as shown in FIG. 2. Again as previously described above, discharge pulses are applied to the X and Z distance counters from the function generator, which pulses are proportional to movement of the cutting tool, until the X and Z counters are discharged to zero. At this time a single advance pulse is obtained at output terminals $P_2$ of OR gate 32, which pulse is derived from overlapping advance pulses produced at output terminals $B_5$ and $C_5$ of respective X and Z distance counters 52 and 54. As stated above, the advance pulse is applied to shift input terminal $I_3$ of shift register 46 and the bit of information is transferred to third stage 70 of the shift register.

When the bit of information is in the third stage, an enabling signal is applied from an output terminal $I_5$ of the third stage of the shift register to an input terminal $L_3$ of OR gate 34 and to an input terminal $N_2$ of AND gate 44. Upon application of the enabling signal to OR gate 34, switch means 24 is closed as previously described, and the coded signal within X sum register 18 is again transmitted to X distance counter 52 to again set the count within the counter to a value which will determine the third path of movement in the remove direction of the cutting tool, as shown in FIG. 1. Inasmuch as AND gate 44 is receiving an enabling signal at its input terminal $N_1$ from output terminal $B_4$ of counter 52 when the count within counter 52 is greater than zero, and is also receiving an enabling signal at its input terminal $N_2$ from output terminal $I_5$ of the third stage of the shift register, a signal level is generated at an output terminal $N_3$ of AND gate 44, which signal level is applied to a control terminal of switch means 60 so as to cause switch means 60 to close. This, in turn, results in the positive voltage supply ($\pm V$) being applied via a power output terminal $O_3$ to an appropriate motor drive for the cutting tool so as to enable movement of the cutting tool along the third (removal) path of movement, which path of movement is equal to but in the opposite direction to the first path of movement. As the cutting tool again is moving along the third path of movement, discharge pulses are received from the function generator as previously described and are applied to terminal $B_2$ of X distance counter 52. The X distance counter is finally discharged to zero when the cutting tool has reached the end of its path, whereupon the signal level at output terminal $B_4$ changes so as to disable AND gate 44, which in turn causes switch means 60 to open and the power to be disconnected from the motor drive for the cutting tool, thereby bringing the cutting tool to a halt. Similarly, as previously stated, when counter 52 discharges to zero, an advance pulse is generated at output terminal $B_5$, which advance pulse is applied via OR gate 32 to shift input terminal $I_3$ of shift register 46. The advance pulse causes the bit of information to be shifted from the third stage to a fourth stage 72 of four stage shift register 46.

As soon as the bit is received within the fourth stage of the shift register, a discharge signal from an outout terminal $I_6$ of fourth stage 72 is applied to a count down input terminal $H_2$ of reversible counter 48, which causes the count within the reversible counter to be reduced by a value of 1. At the same time an enabling signal from an output terminal $I_7$ of fourth stage 72 of register 46 is applied to an input terminal $S_2$ of AND gate 40 and is also applied to an input terminal $R_3$ of OR gate 36. This, in turn, causes a signal level to be applied from output terminal $R_2$ of OR gate 36 to the control terminals of respective switch means 26 and 28, whereupon switch means 26 and 28 are again closed. If a straight (non-tapered) cut is being made on the work piece, as shown in FIG. 1, no signal stored within $X_p$ register 20, and only the signal stored within $Z_p$ register 22 is transmitted to Z distance counter 54 via its input terminal $C_3$ so as to again set the count within Z distance counter 54 to a value which determines the return path of the cutting tool. As soon as the count within Z distance counter 54 is set, an enabling signal from output terminal $C_4$ of counter 54 is again applied to $S_1$ input terminal of AND gate 40. This enables AND gate 40, since an input signal is also being applied to its input terminal $S_2$ from output terminal $I_7$ of fourth stage 72 of the shift register. When AND gate 40 is enabled, an output signal from its output terminal $S_3$ is applied to the control input terminal of switch means 62. This, in turn, causes switch means 62 to close and the positive power supply ($\pm V$) to be applied via a power output terminal $O_4$ to an appropriate motor drive for the cutting tool so as to allow the cutting tool to move along the ($\pm Z_p$) return path, as shown in FIG. 1, towards the starting point, which return path is equal to but in the opposite direction to the second path. As the cutting tool is moving along the return path, again discharge pulses are applied from the function generator to input terminal $C_2$ of the Z distance counter 54 until the counter is discharged to zero. Upon discharge to zero of counter 54, the signal level at output terminal $C_4$ changes so as to disable AND gate 40, which, in turn, causes switch means 62 to open and thereby disconnect power to the motor drive for cutting tool so as to halt any further movement of the cutting tool.

Again, once the count within Z distance counter 54 is discharged to zero, an advance pulse is produced at output terminal $C_5$ which is again applied through OR gate 32 to shift input terminal $I_3$ of shift register 46. If the count within reversible counter 48, which has already been reduced by a value of 1, is greater than zero, an output signal will be present at an output terminal $H_3$ of counter 48, which is, in turn, applied to a control terminal of switch means 50 so as to cause switch means 50 to remain closed for as long as the count within the reversible counter is greater than 1. Thus, when switch means 50 is closed and the advance pulse is applied to the shift register while the bit of information is in the fourth stage, the bit of information is transferred from its output terminal $I_8$ of the fourth stage back to an input terminal $J_3$ of OR gate 30 and then through output terminal $J_2$ of OR gate 30 to input terminal $I_1$ of first stage 66 of the shift register. Once the bit of information is again within the first stage of the shift register, the cutting cycle begins again. However, it should be noted that the bit pulse which is transferred from output terminal $I_8$ of the fourth stage of the shift register to input terminal $I_1$ of the first stage via OR gate 30, also is transmitted from output terminal $J_2$ of OR gate 30 to control input terminal $K_1$ of inhibit gate 29 so as to enable the coded signal within $X_d$ register 16 to again be transmitted to input terminal $D_2$ of X sum register 18. This causes the coded signal within register 18 to be increased by the value of $X_d$ shown in FIG. 1 so an identical cut to that of the first cut will be made during the second cutting cycle of the work piece. The second cutting cycle is repeated and is the same as the first cutting cycle, whereupon when the bit of information is transferred to the fourth (return) stage of the shift register, the count within reversible counter 48 is again reduced by 1. These cutting cycles continue until the count within reversible counter 48 is reduced to zero, at which time the output signal at output terminal $H_3$ of reversible counter 48 changes so as to cause switch means 50 to open. This prevents the bit of information to be recycled from the fourth stage of the shift register back to the first stage upon receipt of an advance pulse at input terminal $I_3$.

However, an output terminal $H_4$ of counter 48, which can be coupled to output terminal $H_3$ via an inverter, is coupled to an input terminal $T_1$ of AND gate 45, and output terminal $P_2$ of OR gate 32 is coupled to an input terminal $T_2$ of AND gate 45. Thus, when counter 48 is discharged to zero, and an enabling signal is applied from output terminal $H_4$ to input terminal $T_1$ of AND gate 45, upon application of an advance pulse to input terminal $T_2$, AND gate 45 is enabled. This causes an enabling signal from an output terminal $T_3$ of AND gate 45 to be applied to input terminal $A_2$ of the tape reader so as to allow the punch tape to advance and the information within the tape reader to be updated to provide the next series of coded signals to control the next series of repetitive cutting cycles for the work piece. In this manner a first series of roughing cuts can be made on a work piece being cut by a cutting tool on a lathe, and then another series of smoothing cuts can be made to reduce the work piece to the desired value.

At this point it should be noted that if the sloping cut were being made on the work piece, as shown in FIG. 2, when the bit of information is in fourth (return) register 72 of the shift register, the coded signal from output terminal $G_2$ of $X_p$ register 20 would again be transmitted to X distance counter 52 so that both the X and Z distance counters can be set to their desired value for the return path. Similarly, the output signal from $G_3$ would cause switch means 27 to be closed so that both switch means 62 and 60 could be closed, thereby enabling the cutting tool to move along the return path as shown in FIG. 2.

Thus, as described above, it is clear that the means for enabling successive and sequential movement of the cutting tool over a complete cutting cycle of a work piece is provided by four stage shift register 46, and a means for consecutively advancing the bit through each of the four stages during the course of one of the cutting cycles. The means for controlling the continuation of the cutting of the work piece over additional identical cutting cycles is provided by reversible counter 48 and switch means 50, which are coupled to the four stage shift register. Furthermore, the means for consecutively advancing the bit through each of the four stages during the course of one of the cutting cycles is provided by the combination of storage registers 16, 20, 22, summing register 18, respective X and Z distance counters 52 and 54, switch means 24, 26 and 28, OR gates 30, 32, 34 and 36 and inhibit gate 29. It should also be noted that the coded signals referred to previously could be binary, binary coded decimal or other suitable type of signals.

Thus, in the manner described above, the number of predetermined identical cutting cycles can be controlled for a work piece being cut by a cutting tool on a lathe without the need for elaborate software, and also without the need for complex calculations being made. Furthermore, it should be understood that although the work piece is being shown as having cuts made thereon along the full length of the work piece, a first section of the work piece can be cut to its desired value, and other sections of the work piece can be cut thereafter until the whole work piece is reduced to its desired shape.

Although the invention has been described with reference to a specific embodiment thereof, numerous modifications are possible without departing from the invention, and it is desirable to cover all modifications falling within the spirit and scope of this invention.

What I claim as new and desired to secure by Letters Patent of the United States is:

1. Apparatus for controlling repetitive cutting cycles on a work piece being cut by a cutting tool of a lathe, comprising:
   a. means for storing a plurality of coded signals to control a depth to cut, a length of cut, a removal and a return path for a cutting cycle, and a desired number of identical cutting cycles;
   b. means for enabling successive and sequential movement of the cutting tool over a complete cutting cycle of the work piece; and
   c. means coupled and responsive to said enabling means for controlling continuation of the cutting of the work piece over additional identical cutting cycles, the number of cutting cycles being predetermined by a coded signal received by said controlling means from said storing means, and the depth of the cut for each cycle being predetermined by a coded signal received by said enabling means from said storing means.

2. Apparatus for controlling repetitive cutting cycles on a work piece being cut by a cutting tool of a lathe according to claim 1, wherein said enabling means is comprised of:

a. a four stage shift register for receiving a bit of information; and
b. means for consecutively advancing the bit through each of said four stages during the course of one of the cutting cycles, whereby when the bit is wiithin a first stage of said four stage shift register, the cutting tool is moving along a first path to the desired depth of the cut, when the bit is advanced to a second stage of said four stage shift register, the cutting tool is moving along a second path corresponding to the length of the cut as the work piece is actually being cut, when the bit is advanced to a third stage of said four stage shift register, the cutting tool is moving along a removal path opposite in direction to the first path, and when the bit is advanced to a fourth stage of said four stage shift register, the cutting tool is being moved along a return path opposite in direction to the second path.

3. Apparatus for controlling repetitive cutting cycles on a work piece being cut by a cutting tool of a lathe according to claim 2, wherein said means for controlling continuation of the cutting of the work piece over additional identical cutting cycles is comprised of:
a. a third reversible counter for receiving a coded signal from said storing means to set the count within said third counter to a number corresponding to the predetermined number of cutting cycles required, and for receiving a discharge signal during each cutting cycle from the fourth stage of said shift register when the bit is being advanced into the fourth stage to reduce the count within said third counter until the count is reduced to zero; and
b. means coupled to said third reversible counter for allowing the bit within the fourth stage of said shift register to be transferred to the first stage in response to the receiving of an advance pulse by said shift register until the count within said third reversible counter has been discharged to zero.

4. Apparatus for controlling repetitive cutting cycles on a work piece being cut by a cutting tool of a lathe according to claim 2, further comprising:
a. means coupled to the first and third stages of said shift register for enabling the coded signal within said second storage register to be transmitted to and set the count of said first counter when the bit is within either of the first and third stages; and
b. means coupled to the second and fourth stages of said shift register for enabling the coded signal within said third storage register to be transmitted to and set the count of said second counter when the bit is within either of the second and fourth stages.

5. Apparatus for controlling repetitive cutting cycles on a work piece being cut by a cutting tool of a lathe according to claim 2, further comprising:
a. a fourth storage register for receiving a coded signal from said storing means; and
b. means coupled to the second and fourth stages of said shift register for enabling the coded signal within said fourth storage register to be transmitted to and set the count of said first counter when the bit is within either of the second and fourth stages, whereby the second and return paths of movement of the cutting tool is determined by the square root of the sum of the squares of the highest count within said first and second counters when the bit is within either of the second and fourth stages of said shift register.

6. Apparatus for controlling repetitive cutting cycles on a work piece being cut by a cutting tool of a lathe according to claim 2, further comprising:
a. means coupled to the first stage of said shift register and to said first counter for enabling the cutting tool to move along the first path when the bit is within the first stage and until said first counter is discharged to zero;
b. means coupled to the second stage of said shift register and to said second counter for enabling the cutting tool to move along the second path when the bit is within the second stage and until said second counter is discharged to zero;
c. means coupled to the third stage of said shift register and to said first counter for enabling the cutting tool to move along the removal path when the bit is within the third stage and until said first counter is discharged to zero; and
d. means coupled to the fourth stage of said shift register and to said second counter for enabling the cutting tool to move along the return path when the bit is within the fourth stage and until said second counter is discharged to zero.

7. Apparatus for controlling repetitive cutting cycles on a work piece being cut by a cutting tool of a lathe, comprising:
a. means for storing a plurality of coded signals to control a depth of cut, a length of cut, a removal and a return path for a cutting cycle, and a desired number of identical cutting cycles;
b. means for enabling successive and sequential movement of the cutting tool over a complete cutting cycle of the work piece, comprising:
i. a four stage shift register for receiving a bit of information; and
ii. means for consecutively advancing the bit through each of said four stages during the course of one of the cutting cycles, comprising:
1. a first storage register for receiving from said storing means a coded signal indicative of the depth of cut to be made;
2. a second storage register for receiving and summing the coded signal indicative of the depth of cut to be made to provide a signal indicative of the full movement required of the cutting tool along the first path for each of the successive cutting cycles;
3. a third storage register for receiving from said storing means a coded signal indicative of the length of the second and fourth paths of movement of the cutting tool;
4. a first and a second reversible counter for receiving the coded signals respectively from said second and third storage registers to set each of said first and second counters to a count corresponding to the desired path of movement of the cutting tool, and for receiving respective discharge signals corresponding to the actual movement of the cutting tool to reduce the count within each of said respective counters to zero when the cutting tool has reached the end of its designated path; and
5. means for providing a signal to said four stage shift register when either of said counters is discharged to zero count to advance the bit stored within said shift register to the next successive stage, whereby when the bit is within a first stage of said four stage shift register, the cutting tool is moving along a first path to the desired depth of the cut, when the bit is advanced to a second stage of said four stage shift register, the cutting tool is moving along a second path corresponding to the length of the cut as the work piece is actually being cut, when the bit is advanced to a third stage of said four stage shift register, the cutting tool is moving along a removal path opposite in direction to the first path, and when the bit is advanced to a fourth stage of said four stage shift register, the cutting tool is being moved along a return path opposite in direction to the second path; and c. means coupled and responsive to said enabling means for controlling continuation of the cutting of the work piece over additional identical cutting cycles.

8. Apparatus for controlling repetitive cutting cycles on a work piece being cut by a cutting tool of a lathe, comprising:
 a. means for storing a plurality of coded signals to control a depth of cut, a length of cut, a removal and a return path for a cutting cycle, and a desired number of identical cutting cycles;
 b. means for enabling successive and sequential movement of the cutting tool over a complete cutting cycle of the work piece, comprising:
  i. a four stage shift register for receiving a bit of information; and
  ii. means for consecutively advancing the bit through each of said four stages during the course of one of the cutting cycles, whereby when the bit is within a first stage of said four stage shift register, the cutting tool is moving along a first path to the desired depth of the cut, when the bit is advanced to a second stage of stage shift register, the cutting tool is moving along a second path corresponding to the length of the cut as the work piece is actually being cut, when the bit is advanced to a third stage of said four stage shift register, the cutting tool is moving along a removal path opposite in direction to the first path, and when the bit is advanced to a fourth stage of said four stage shift register, the cutting tool is being moved along a return path opposite in direction to the second path; and
 c. means coupled and responsive to said enabling means for controlling continuation of the cutting of the work piece over additional identical cutting cycles, comprising:
  i. a reversible counter for receiving a coded signal from said storing means to set the count within said counter to a number corresponding to the predetermined number of cutting cycles required, and for receiving a discharge signal during each cutting cycle from the fourth stage of said shift register when the bit is being advanced into the fourth stage to reduce the count within said counter until the count is reduced to zero; and
  ii. means coupled to said reversible counter for allowing the bit within the fourth stage of said shift register to be transferred to the first stage in response to the receiving of an advance pulse by said shift register until the count within said reversible counter has been discharged to zero.

* * * * *

UNITED STATES PATENT OFFICE
CERTIFICATE OF CORRECTION

PATENT NO. : 4,017,723
DATED : April 12, 1977
INVENTOR(S) : Ellwood D. Fickes

It is certified that error appears in the above-identified patent and that said Letters Patent are hereby corrected as shown below:

Column 10, line 50, delete "to" and substitute --of-- therefor.

Column 11, line 5, delete "wiithin" and substitute --within--.

Column 14, line 5, before "stage" insert --said four--.

Signed and Sealed this twelfth Day of July 1977

[SEAL]

Attest:

RUTH C. MASON
Attesting Officer

C. MARSHALL DANN
Commissioner of Patents and Trademarks